Dec. 25, 1956 W. L. BRENSIKE ET AL 2,775,142
DIFFERENTIAL
Filed April 21, 1953 2 Sheets-Sheet 1

Inventors
Walter L. Brensike
Harold R. Brensike
by
Attys.

Dec. 25, 1956    W. L. BRENSIKE ET AL    2,775,142
DIFFERENTIAL
Filed April 21, 1953    2 Sheets-Sheet 2

Inventors
Walter L. Brensike
Harold R. Brensike
by Attys.

United States Patent Office 2,775,142
Patented Dec. 25, 1956

2,775,142

DIFFERENTIAL

Walter L. Brensike, Appleton, and Harold R. Brensike, New London, Wis.

Application April 21, 1953, Serial No. 350,096

8 Claims. (Cl. 74—711)

This invention relates to improvements in differentials and more particularaly relates to a differential of the torque-proportioning type.

Our invention has as one of its principal objects to provide a simple and compact form of differential suitable for universal use on various types of automotive vehicles which will provide tractive effort for the vehicle wheel on dry pavement where the other wheel is on slippery pavement.

Another object of our invention is to provide a novel and efficient differential for use on automotive vehicles which will act as the conventional differential under normal driving conditions and will provide an unequal distrbution of the torque when the traction of one wheel is low.

Still another object of our invention is to provide a torque-proportioning differential arranged with a view toward preventing stalling of the vehicle when one wheel has a low tractive effort, and of such a compact construction as to be interchangeable with the conventional differentials commonly used on automotive vehicles.

Still another object of our invention is to provide a simplified form of torque-proportioning differential in which the differential pinions rotate with the casing and have drive connection with the axle gears through intermediate coupling pinions.

Still another object of our invention is to provide a simplified form of differential wherein a geared coupling is provided between the differential pinions and axle gears, providing a rolling, thrusting and coupling drive to the axle gears and unequally distributing torque between the two axle gears, when one wheel is on slippery pavement.

Another and important object of our invention is to provide a torque-proportioning differential in which the differential pinions are relatively closely spaced and rotate about parallel axes extending along opposite sides of the axes of rotation of the axle gears and mesh with intermediate pinions, retained to rotate about axes perpendicular to an axis intersecting the axes of the axle gears, and providing a thrusting and coupling drive between the intermediate pinions and axle gears, to distribute the torque to the axle drive gear having high traction, but acting as a normal differential under ordinary driving conditions.

Still another object of our invention is to provide a bevel gear type of torque-proportioning differential including at least two sets of closely spaced differential pinions meshing with intermediate coupling pinions and imparting a thrusting coupling effect between the differential pinions and the axle drive gears.

These and other objects of our invention will appear from time to time as the following specification proceeds and with reference to the accompanying drawings wherein.

Figure 1:
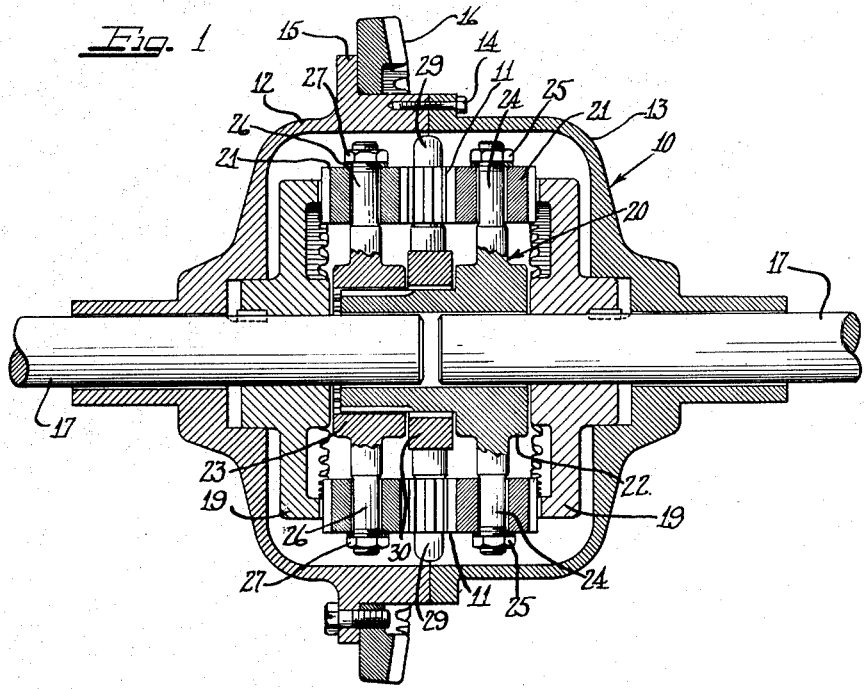
Figure 1 is a diagrammatic vertical sectional view taken through one form of differential constructed in accordance with our invention.
Figure 2:
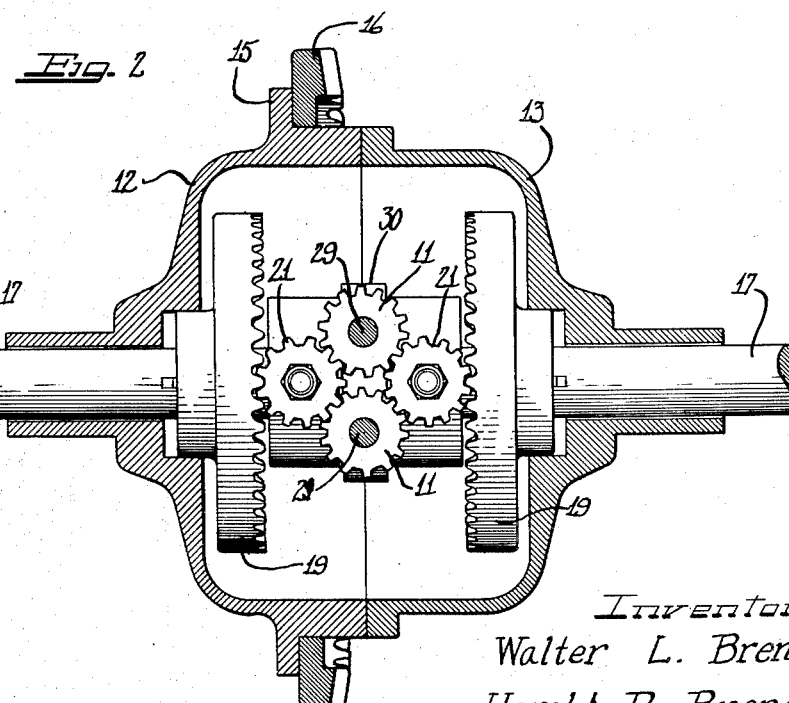
Figure 2 is a plan view of the differential shown in Figure 1, with the differential casing shown in horizontal section.

In the embodiment of our invention illustrated in Figures 1 and 2 of the drawings, we have shown a differential utilizing spur differential pinions 11, 11, encased in a rotatably driven casing 10 and orbitally driven thereby. The casing 10 is shown as including two casing parts 12 and 13, shown as being in abutting relation with respect to each other and secured together by machine screws 14. The casing part 12 is shown as having annular flange 15 extending therearound to which is secured the usual ring gear 16, which may be driven from the usual drive pinion (not shown). The casing 10 is journalled within the usual differential and axle housing (not shown) having drive axles 17, 17 extending therealong and journalled therein. The axles 17, 17 may be keyed or otherwise secured to axle drive gears 19, 19, which may be journalled on their hubs within the casing parts 12 and 13 in any well known manner, so not herein shown or described.

Journalled or otherwise rotatably mounted coaxial with the axes of rotation of the shafts 17, 17 is a spider or cage 20 for intermediate coupling pinions 21, 21. The cage 20 is herein shown as being in two parts 22 and 23, one part of which is splined on the other to effect orbital travel of the pinions 21, 21 about the axis of the axles 17, 17 together. The part 22 is shown as having diametrically opposed shafts 24, 24 extending therefrom on which are rotatably journalled the pinions 21, 21. The cage parts 22 and 23 may be secured together in a suitable manner to provide a unitary cage.

Nuts 25, 25 are shown as retaining said pinions to said shafts. The cage part 23 is likewise shown as having two diametrically opposed shafts 26, 26 extending therefrom on which the intermediate coupling pinions 21, 21 are rotatably journalled and retained thereto by means of nuts 27, 27.

The intermediate coupling pinions 21, 21 are shown as meshing with two adjacent differential pinions 11, 11 and with the axle gears 19, 19 which may be crown axle gears.

The teeth of the axle gears 19, 19 may also mesh relatively loosely with the teeth of the intermediate coupling pinions 21, 21, to avoid binding when one axle is traveling relatively to the other, as when the vehicle is turning a corner.

The differential pinions 11, 11 are shown as being journalled on shafts 29, 29, secured at their outer ends to the casing formed by the casing parts 12 and 13, and supported at their inner ends on a spider 30 rotatably mounted on the cage 20 and between the cage parts 22 and 23.

Assuming the tractive effort of both wheels is equal, as when the vehicle is travelling along a straight hard surfaced road, the ring gear 16 will drive the differential casing and differential pinions 11, 11 in an orbital path about the axis of the axles 17, 17. The differential pinions 11, 11 will react against the intermediate coupling pinions 21, 21 meshing with the axle gears 19, 19 and the differential pinions 11, 11 and impart a driving thrust thereto. The torque on both axle gears being equal, the intermediate pinions 21, 21 and the axle gears 19, 19 will rotate as a unit with the casing 10 and differential pinions 11, 11 and drive the two axles 17, 17 at the same speed.

In turning a corner, however, the inner wheel will slow down as in a conventional differential and one coupling pinion 21 will rotate about the inner axle gear 19 which will rotate the differential pinions 11 and the opposite coupling pinion 21. This will drive the outer axle gear 19 at an increased speed with a resultant increase in speed of the outer wheel in the conventional manner.

When one wheel of the vehicle is on a slippery surface and the other wheel is on dry pavement, the orbitally travelling differential pinions 11, 11 will present oppositely acting angular thrusting drive couplings to the two laterally spaced intermediate coupling pinions 21, 21 in directions to force said coupling pinions to exert angular driving forces to the two axle gears 19, 19 along lines of thrust intersecting the axes of the pinions 11 and the axes of the meshing pinions 21, 21. The frictional resistance to rotation of the wheel on slippery pavement will also impart a force to tend to rotate its coupling pinion in a direction opposite to which the opposite coupling pinion 21 tends to rotate. This will cause opposite reactions against the differential pinions 11, 11 tending to lock them from rotation, and coupled with the angular thrusting action caused by the tendency of the differential pinions 11 to move between the intermediate coupling pinions 21, due to the fact that the carrier for the differential pinions is relatively movable with respect to the carrier for the coupling pinions, will tend to wedge the differential pinions 11, 11 into closer engagement with the intermediate coupling pinions 21, 21. This will create a thrusting and binding effect between the differential and coupling pinions and creates frictional component supplying a proportion of the torque to the axle and axle gear transmitting power to the wheel which is on dry pavement. The wheel on dry pavement may then exert tractive effort against the pavement to propel the vehicle until the tractive effort of the wheel formerly on the slipper surface is sufficient to propel the vehicle. As the tractive effort of the two wheels becomes equal, the torque distribution to the two wheels will come into balance and the differential will again operate as a normal differential.

It should be understood, however, that due to the tendency of the intermediate coupling pinions to rotate about the axle gear whose wheel is on dry pavement that the torque distribution to the wheel on dry pavement is always less than the total amount of torque that is supplied by the differential, but that due to the wedging of the pinion 11 with pinions 21, 21 a limited torque is supplied to the wheel on dry pavement which is greater than the torque to the wheel on slippery pavement. It is desirable, however, that the wheel on slippery pavement offer some resistance to rotation to attain the binding effect.

Figure 3:
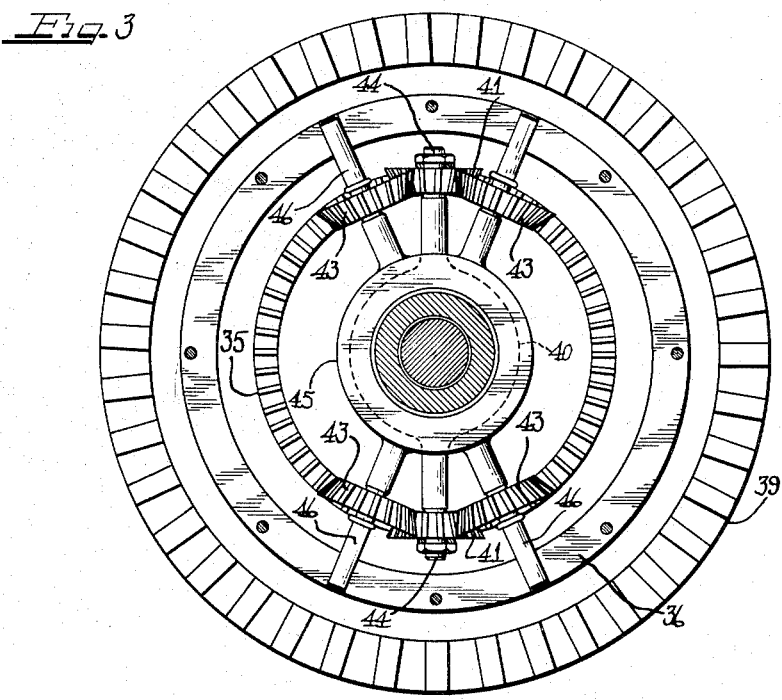
Figure 3 is a transverse diagrammatic sectional view taken through another form of differential constructed in accordance with our invention, diagrammatically showing the principle of our invention applied to a bevel gear type of differential.
Figure 4:
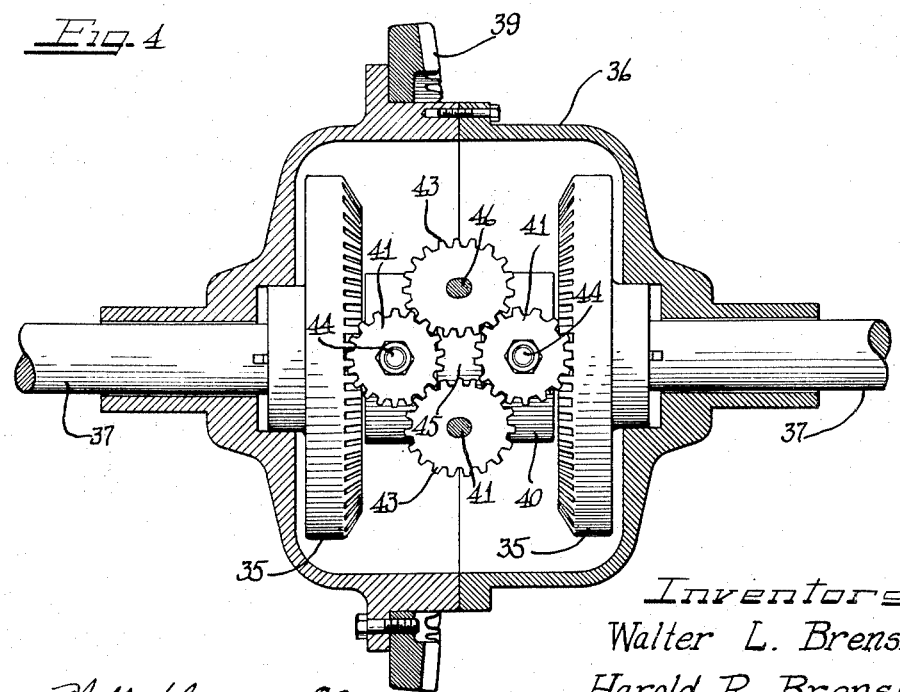
Figure 4 is a plan view of the differential shown in Figure 3 with the differential casing shown in horizontal section.

The differential illustrated in Figures 3 and 4 of the drawings operates on the same principles as that illustrated in Figures 1 and 2. In these figures, we have shown a bevel gear type of differential, in which bevel axle gears 35, 35 encased in a differential casing 36 are shown as being keyed or otherwise secured to axles 37, 37. The casing 36 may be substantially the same as the casing illustrated in Figures 1 and 2 and may be driven from a ring gear 39. A cage or spider 40 is shown as carrying intermediate coupling pinions 41, 41, each of which meshes with an axle gear 35 and also meshes with a pair of differential pinions 43, 43. The cage 40 may be a two part cage, like the cage 20 shown in Figure 1, and is shown as having a plurality of diametrically opposed radially extending shafts 44, 44 extending therefrom and rotatably carrying the intermediate coupling pinions 41, 41. A spider or cage 45 is shown as being rotatably mounted on the cage 40 between the coupling pinions 41, 41 and as carrying radially extending shafts 46, 46 upon which the differential pinions 43, 43 are rotatably mounted. The shafts 46, 46 are shown as being secured at their outer ends to the casing 36, which rotates said shafts and orbitally drives the differential pinions 43, 43.

In this form of our invention all of the shafts 44, 44 and 46, 46 are radially extending shafts, to support the differential and intermediate coupling pinions to mesh with each other. The teeth of the differential pinions 43, 43 and the coupling pinions 41, 41 as well as the teeth of the axle gears 35, 35 may be cut to conform to the angles of the shafts 44, 44 and 46, 46, it being understood that said pinions are shown diagrammatically herein, for the sole purpose of illustrating the principles of my invention and that no attempt has been made to show the detailed tooth forms, which may be of any suitable form.

In the form of my invention illustrated in Figures 3 and 4, the principle of operation of the differential is the same as that shown in Figures 1 and 2. During normal operation of the vehicle where the tractive effort of the two wheels on the pavement is the same, the torque will be equally divided between these wheels, and the cage 40 will rotate with the casing 36, and the pinions 43, 43 and 41, 41 will rotate as a unit and drive the axle gears 35, 35 at the same rate of speed. When, however, there may be a tendency for one axle gear to slow down, as when its associated wheel is rounding a corner, the other axle gear will be speeded up by movement of the associated coupling pinion around the one axle gear, to equalize the driving effect to the other axle gear.

It may be seen from the foregoing that we have provided an extremely simple and effective torque-proportioning differential, proportioning the torque between the axles for the two driving wheels of a motor vehicle, so that the wheel on dry pavement will always be supplied with a greater proportion of torque than the wheel on the slippery pavement, and that the torque supplied to the wheel on the dry pavement will be sufficient to prevent the vehicle from stalling and to start the vehicle under slippery driving conditions.

It may further be seen that the differential normally functions as a conventional differential and the unequal proportioning of the torque is attained by the angular thrusting coupling effect between the differential pinions 11, 11 on one carrier, which is the differential casing and the intermediate coupling pinions 21, 21 on another carrier relatively movable with respect to the one carrier and meshing with the axle drive gears 19, 19 when the traction tends to become unequal, tending to lock or wedge the driving differential pinions 11, 11 into closer engagement with the intermediate coupling pinions 21, 21 and slow down the differential action of the differential or in effect partially lock the differential to supply torque to the axle whose wheel is on firm or dry ground or pavement.

It will be understood that modifications and variations in this invention may be effected without departing from the scope of the novel concepts thereof.

W claim as our invention:

1. A torque-proportioning differential comprising a rotatably driven casing, a pair of axially aligned axle gears contained therein for rotation about an axis coaxial therewith, at least two differential pinions journaled in said casing about spaced parallel axes extending along each side of the axis of said axle gears and perpendicular thereto, two intermediate coupling pinions rotatable about spaced parallel axes intersecting the axis of rotation of said axle gears and meshing with two differential pinions and one of said axle gears, and a cage for said intermediate coupling pinions rotatable about the axis of rotation of said axle gears and relatively movable with respect to said casing about the axis of rotation thereof.

2. A torque-proportioning differential comprising a rotatably driven casing, a pair of axially aligned axle gears contained therein and rotatable about axes coaxial therewith, two pairs of diametrically opposed differential pinions carried by said casing and orbitally driven thereby, and rotating about spaced parallel axes perpendicular to and spaced on opposite sides of the axis of rotation of said axle gears, a cage rotatably mounted between said axle gears for rotation about the axis of rotation thereof and independently of rotation of said axle gears, said cage having two pairs of spaced diametrically opposed intermediate cupling pinions rotatably carried thereby, for rotation about axes intersecting the axis of said axle gears, each coupling pinion of said pair of pinions meshing with two of said differential pinions and one of said axle gears, and exerting a thrusting and coupling component of force to said axle gears in accordance with the torque distribution thereon.

3. In a torque-porportioning differential, a rotatable casing, a pair of axially aligned axle gears contained therein and rotatable about the axis of rotation thereof independently of said casing, a two piece cage journalled for rotation about the axis of rotation of said axle gears, said cage rotating as a unit and each part thereof having a pair of diametrically opposed intermediate coupling pinions journalled thereon and rotatably carried thereby for rotation about axes which if extended would intersect the extended axis of rotation of said axle gears, said coupling pinions meshing with said axle gears, a second cage rotatably carried by said first cage intermediate said coupling pinions, at least two shafts carried by said second cage and extending therefrom and secured to said casing and rotated thereby, each of said shafts having a differential pinion rotatably carried thereby, said differential pinions meshing with opposite intermediate coupling pinions and exerting a wedging thrusting load thereon, upon an unequal torque distribution on said axle gears, to impart a driving effect to the axle gear whose wheel has the highest tractive effect.

4. A torque-porportioning differential comprising two aligned bevel axle gears, a casing therefor journalled for rotation about an axis coaxial with the axis of rotation of said axle gears, a ring gear for driving said casing, at least two closely spaced bevel differential pinions journalled in said casing and orbitally driven thereby, a cage rotatable about an axis coaxial with the axis of rotation of said axle gears and relatively movable with respect to said casing, and at least two intermediate bevel coupling pinions carried by said cage, each meshing with one of said differential pinions and with one of said axle gears.

5. A torque-porportaining differential comprising two aligned bevel axle gears, a casing therefor journalled for rotation about an axis coaxial with the axis of rotation thereof, a ring gear for driving said casing, at least two closely spaced shafts extending radially of said casing and counted therein, a bevel differential pinion on each of said shafts, two intermediate bevel coupling pinions rotatable about axes spaced on each side of said shafts a cage for said intermediate coupling pinions rotatable about the axis of said axle gears and relatively movable with respect to said casing about the axis of rotation thereof, said coupling pinions meshing with said differential pinion and each meshing with one of said axle gears.

6. A torque-proportioning differential comprising two axially aligned axle gears, a casing therefor journalled for rotation about an axis coaxial with the axis of rotation of said axle gears, a cage contained within said casing and mounted for rotation about an axis coaxial with the axis of said axle gears, two spaced shafts carried by said cage and extending radially of said casing, a coupling pinion rotatably carried by each of said shafts and meshing with one of said axle gears, shafts means carried by said casing and extending inwardly thereof, and differential pinions carried by said shaft means, said differential pinions meshing with said coupling pinions and orbitally driving the same together upon rotation of said casing, when the torque distribution to said axle gears is equal.

7. A torque-proportioning differential comprising two axially aligned axle gears, a casing therefor journalled for rotation about an axis coaxial with the axis of rotation of said axle gears, a ring gear rotatably driving said casing, said casing having shaft means carried thereby and extending inwardly therefrom, bevel differential pinions rotatably carried by said shaft means and orbitally driven by said casing, a cage rotatable about an axis coaxial with the axis of rotation of said axle gears and having a plurality of diametrically opposed shafts extending therealong and spaced on opposite sides of said first mentioned shaft means carried by said casing, and intermediate coupling pinions carried by said last mentioned shafts on said cage, each of said pinions meshing with at least one of said differential pinions and one of said axle gears.

8. In a torque proportioning differential, a drive casing, a ring gear for driving said casing, a pair of axially aligned axle gears contained therein, for relative rotatable movement with respect thereto, spaced differential pinions within said casing and intermediate coupling pinions meshing therewith, said differential pinions each meshing with two oppositely disposed coupling pinions and said coupling pinions each meshing with an individual axle gear, and two relatively movable carriers, one carrying said differential pinions and comprising said casing and the other carrying said coupling pinions and comprising a cage mounted within said casing for relative movement with respect to said casing about the axes of said axle gears.

References Cited in the file of this patent
UNITED STATES PATENTS

| | | |
|---|---|---|
| 1,397,066 | Williams | Nov. 15, 1921 |
| 2,158,157 | Seeck | May 16, 1939 |
| 2,270,567 | Slider | Jan. 10, 1942 |
| 2,342,755 | Randall | Feb. 29, 1944 |